US008538128B2

(12) United States Patent
Mellin et al.

(10) Patent No.: US 8,538,128 B2
(45) Date of Patent: Sep. 17, 2013

(54) METHOD FOR DETERMINING THE LOCATION OF AN ADDITIVE IN AN ARTICLE

(75) Inventors: André Mellin, Amberley Village, OH (US); Michael Paul Hausfeld, Sharonville, OH (US); John Matthew Anast, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 246 days.

(21) Appl. No.: 13/083,668

(22) Filed: Apr. 11, 2011

(65) Prior Publication Data

US 2012/0257812 A1    Oct. 11, 2012

(51) Int. Cl.
*G06K 9/00*    (2006.01)

(52) U.S. Cl.
USPC ........... 382/141; 382/142; 382/143; 382/144; 382/145; 382/146; 428/40.1

(58) Field of Classification Search
USPC .................................................. 382/141–152
See application file for complete search history.

(56) References Cited

U.S. PATENT DOCUMENTS

| | | | | |
|---|---|---|---|---|
| 6,544,386 B1* | 4/2003 | Krzysik et al. | ................ | 162/123 |
| 2006/0209301 A1* | 9/2006 | Gardner et al. | ................ | 356/301 |
| 2007/0272381 A1* | 11/2007 | Elony et al. | ................... | 162/123 |
| 2010/0210165 A1* | 8/2010 | Stralin et al. | .................. | 442/381 |
| 2010/0297377 A1* | 11/2010 | McNeil et al. | .................. | 428/43 |
| 2011/0033082 A1* | 2/2011 | Beckstead et al. | ............. | 382/100 |
| 2011/0188731 A1* | 8/2011 | Sekiguchi | ..................... | 382/141 |

OTHER PUBLICATIONS

U.S. Appl. No. 13/433,336, filed Mar. 29, 2012, Rauckhorst, et al.
U.S. Appl. No. 13/433,341, filed Mar. 29, 2012, Rauckhorst.

* cited by examiner

*Primary Examiner* — Kim Vu
*Assistant Examiner* — Ruiping Li
(74) *Attorney, Agent, or Firm* — Sarah M. DeCristofaro; C. Brant Cook

(57) ABSTRACT

A method for determining the location of an additive, especially an additive that is not visible to a consumer, in an article with respect to a surface feature of the article is provided.

17 Claims, 6 Drawing Sheets

METHOD FOR DETERMINING THE LOCATION OF AN ADDITIVE IN AN ARTICLE

FIELD OF THE INVENTION

The present invention relates to a method for determining the location of an additive, especially an additive that is not visible to a consumer, in an article with respect to a surface feature of the article.

BACKGROUND OF THE INVENTION

Articles containing additives that are not visible to consumers of the articles, such as plybond glue and colorless surface additives, such as surface softening agents, are known in the art. However, determining where such an additive is located in the article with respect to a surface feature of the article using currently available methods is challenging. For example, formulators currently include a fluorescing agent, such as Tinopal® commercially available from BASF, into plybond glue for a fibrous structure so the presence of the plybond glue can be detected under UV-light. In addition, formulators have applied a solution of boric acid and iodine to fibrous structures so the presence of any plybond glue can be detected by the visible eye when the plybond glue turns blue. However, under such examples there are no images of the surface and/or the additive present in the fibrous structure that are captured and thus no analysis as to the location of the plybond glue with respect to a surface feature of the fibrous structure is subjective.

Accordingly, there is a need for a method for determining the location of an additive in an article with respect a surface feature of the article that is more objective than current methods of doing the same.

SUMMARY OF THE INVENTION

The present invention fulfills the need described above by providing a method for determining the location of an additive in an article.

In one example of the present invention, a method for determining the location of an additive with respect to a surface feature of an article, such as a web and/or fibrous structure, comprising the additive, wherein the method comprises the steps of:
 a. collecting data from a surface of an article;
 b. collecting data from an additive present in the article; and
 c. comparing the data from the surface of the article and the data from the additive present in the article to determine the location of the additive present in the article with respect to a surface feature present on the surface of the article, is provided.

In another example of the present invention, a method for determining the location of an additive with respect to a surface feature of an article, such as a web and/or fibrous structure, comprising the additive, wherein the method comprises the steps of:
 a. collecting data from a surface of an article;
 b. collecting data from an additive present in the article;
 c. generating an image from the data collected from the surface of the article;
 d. generating an image from the data collected from the additive present in the article; and
 e. comparing the images to determine the location of the additive present in the article with respect to a surface feature present on the surface of the article, is provided.

Accordingly, the present invention provides a method for determining the location of an additive present in an article with respect to a surface feature present on a surface of the article.

DETAILED DESCRIPTION OF THE INVENTION

Definitions

Figure 1:
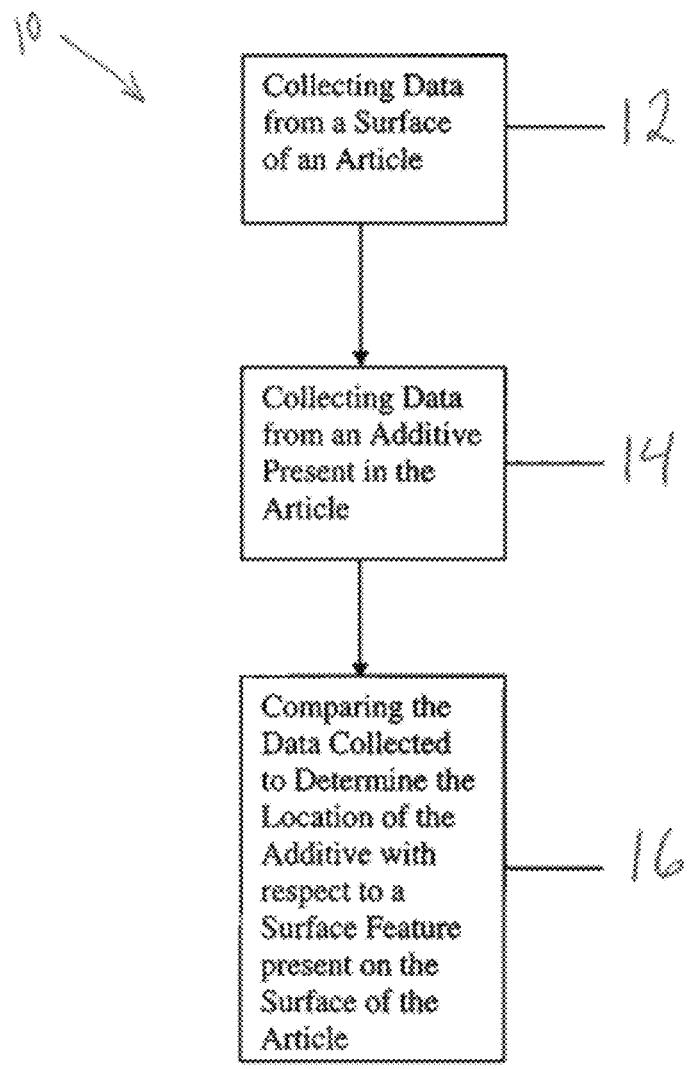
FIG. 1 is a flowchart diagram illustrating on example of method according to the present invention.

"Article" as used herein means a consumer product, which can be a non-edible consumer product or an edible consumer product. Non-limiting examples of non-edible consumer products include non-edible webs, such as non-edible fibrous structures and/or films. One example of a non-edible web is a non-edible fibrous structure such as a sanitary tissue product. Another example of a non-edible web is a non-edible film such as a food wrap and/or packaging film.

Non-limiting examples of edible consumer products include food items, such as potato crisps and/or potato chips, corn chips, and other flavor containing food items and other consumable items, such as mouthwash strips, which may be edible films.

"Fibrous structure" as used herein means a structure that comprises one or more filaments and/or fibers. In one example, a fibrous structure according to the present invention means an orderly arrangement of filaments and/or fibers within a structure in order to perform a function. Non-limiting examples of fibrous structures of the present invention include paper, fabrics (including woven, knitted, and non-woven), and absorbent pads (for example for diapers or feminine hygiene products).

The fibrous structure of the present invention may be of any type, including but not limited to, conventionally felt-pressed fibrous structures; pattern densified fibrous structures; and high-bulk, uncompacted fibrous structures. The fibrous structures may be creped or uncreped and/or through-dried or conventionally dried. The sanitary tissue products made therefrom may be of a single-ply or multi-ply construction.

In one embodiment, the fibrous structure of the present invention is a pattern densified fibrous structure characterized by having a relatively high-bulk field of relatively low fiber density and an array of densified zones of relatively high fiber density. The high-bulk field is alternatively characterized as a field of pillow regions. The densified zones are alternatively referred to as knuckle regions. The densified zones may be discretely spaced within the high-bulk field or may be interconnected, either fully or partially, within the high-bulk field.

In general, pattern densified fibrous structures are preferably prepared by depositing a papermaking furnish on a foraminous forming wire such as a Fourdrinier wire to form a wet fibrous structure and then juxtaposing the fibrous structure against a three-dimensional substrate comprising an array of supports. The fibrous structure is pressed against the three-dimensional substrate, thereby resulting in densified zones in the fibrous structure at the locations geographically corresponding to the points of contact between the array of supports and the wet fibrous structure. The remainder of the fibrous structure not compressed during this operation is referred to as the high-bulk field. This high-bulk field can be further dedensified by application of fluid pressure, such as with a vacuum type device or a blow-through dryer, or by mechanically pressing the fibrous structure against the array of supports of the three-dimensional substrate. The fibrous structure is dewatered, and optionally predried, in such a manner so as to substantially avoid compression of the high-bulk field. This is may be accomplished by fluid pressure, such as with a vacuum type device or blow-through dryer, or alternately by mechanically pressing the fibrous structure against an array of supports of the three-dimensional substrate wherein the high-bulk field is not compressed. The operations of dewatering, optional predrying and formation of the densified zones may be integrated or partially integrated to reduce the total number of processing steps performed. Subsequent to formation of the densified zones, dewatering, and optional predrying, the fibrous structure is dried to completion.

In one embodiment, the papermaking furnish is first formed into a wet fibrous structure on a foraminous forming carrier, such as a Fourdrinier wire. The fibrous structure is dewatered and transferred to a three-dimensional substrate (also referred to generally as an "imprinting fabric"). The furnish may alternately be initially deposited on a three-dimensional foraminous supporting carrier. Once formed, the wet fibrous structure is dewatered and, thermally predried to a selected fiber consistency of between about 40% and about 80%. Dewatering can be performed with suction boxes or other vacuum devices or with blow-through dryers. The knuckle imprint of the imprinting fabric is impressed in the fibrous structure as discussed above, prior to drying the fibrous structure to completion. One method for accomplishing this is through application of mechanical pressure. This can be done, for example, by pressing a nip roll which supports the imprinting fabric against the face of a drying drum, such as a Yankee dryer, wherein the fibrous structure is disposed between the nip roll and drying drum. Also, preferably, the fibrous structure is molded against the imprinting fabric prior to completion of drying by application of fluid pressure with a vacuum device such as a suction box, or with a blow-through dryer. Fluid pressure may be applied to induce impression of densified zones during initial dewatering, in a separate, subsequent process stage, or a combination thereof.

Typically, it is this drying/imprinting fabric which induces the structure to have differential density, although other methods of patterned densifying are possible and included within the scope of the invention. Differential density structures may comprise a field of low density with discrete high density areas distributed within the field. They may alternately or further comprise a field of high density with discrete low density areas distributed within that field. It is also possible for a differential density pattern to be strictly composed of discrete elements or regions, i.e. elements or regions which are not continuous. Continuous elements or regions are defined as those which extend to terminate at all edges of the periphery of the repeating unit (or useable unit in the event that the pattern does not repeat within such useable unit).

Most commonly, differential density structures comprise two distinct densities; however, three or more densities are possible and included within the scope of this invention. For purposes of this invention, a region is referred to as a "low density region" if it possesses a density less than the mean density of the entire structure. Likewise, a region is referred to as a "high density region" if it possesses a density greater than the mean density of the entire structure.

Non-limiting examples of processes for making fibrous structures include known wet-laid papermaking processes and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire or belt such that an embryonic fibrous structure is formed, after which drying and/or bonding the fibers together results in a fibrous structure. The fibrous structure may be creped or uncreped and/or conventionally wet pressed or through-air-dried or a hybrid containing at least one fibrous structure of two or more of the types of fibrous structures.

Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

The fibrous structure of the present invention may exhibit a basis weight between about 10 $g/m^2$ to about 120 $g/m^2$ and/or from about 15 $g/m^2$ to about 110 $g/m^2$ and/or from about 20 $g/m^2$ to about 100 $g/m^2$ and/or from about 30 to 90 $g/m^2$. In addition, the fibrous structure of the present invention may exhibit a basis weight between about 40 $g/m^2$ to about 120 $g/m^2$ and/or from about 50 $g/m^2$ to about 110 $g/m^2$ and/or from about 55 $g/m^2$ to about 105 $g/m^2$ and/or from about 60 to 100 $g/m^2$.

The fibrous structure of the present invention may exhibit a density (measured at 95 $g/in^2$) of less than about 0.60 $g/cm^3$ and/or less than about 0.30 $g/cm^3$ and/or less than about 0.20 $g/cm^3$ and/or less than about 0.10 $g/cm^3$ and/or less than about 0.07 $g/cm^3$ and/or less than about 0.05 $g/cm^3$ and/or from about 0.01 $g/cm^3$ to about 0.20 $g/cm^3$ and/or from about 0.02 $g/cm^3$ to about 0.10 $g/cm^3$.

The fibrous structure of the present invention may be in the form of fibrous structure rolls. Such fibrous structure rolls may comprise a plurality of connected, but perforated sheets of fibrous structure, that are separably dispensable from adjacent sheets. In one example, one or more ends of the roll of fibrous structure may comprise an adhesive and/or dry strength agent to mitigate the loss of fibers, especially wood pulp fibers from the ends of the roll of fibrous structure.

The fibrous structure of the present invention may comprise one or more additives such as softening agents, temporary wet strength agents, permanent wet strength agents, bulk softening agents, lotions, silicones, wetting agents, latexes, especially surface-pattern-applied latexes, dry strength agents such as carboxymethylcellulose and starch, inks, dyes, and other types of additives suitable for inclusion in and/or on fibrous structure.

"Fiber" and/or "Filament" as used herein means an elongate particulate having an apparent length greatly exceeding its apparent width, i.e. a length to diameter ratio of at least about 10. For purposes of the present invention, a "fiber" is an elongate particulate as described above that exhibits a length of less than 5.08 cm (2 in.) and a "filament" is an elongate particulate as described above that exhibits a length of greater than or equal to 5.08 cm (2 in.).

Fibers are typically considered discontinuous in nature. Non-limiting examples of fibers include wood pulp fibers and synthetic staple fibers such as polyester fibers.

Filaments are typically considered continuous or substantially continuous in nature. Filaments are relatively longer than fibers. Non-limiting examples of filaments include meltblown and/or spunbond filaments. Non-limiting examples of materials that can be spun into filaments include natural polymers, such as starch, starch derivatives, cellulose and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. No. 4,300,981 and U.S. Pat. No. 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

In addition to the various wood pulp fibers, other cellulosic fibers such as cotton linters, rayon, lyocell and bagasse can be used in this invention. Other sources of cellulose in the faun of fibers or capable of being spun into fibers include grasses and grain sources.

"Sanitary tissue product" as used herein means a soft, low density (i.e. <about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a sanitary tissue product roll.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Basis Weight" as used herein is the weight per unit area of a sample reported in lbs/3000 ft$^2$ or g/m$^2$.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Surface feature" as used herein with respect to a surface of an article means an embossment, such as a line art embossment and/or a dot embossment, and/or one or more regions that exhibit a different physical property (for example, density, basis weight, softness, tensile strength, flexibility, bulk, caliper, absorbency, and aesthetics including dyes, inks, texture) present on a surface of an article.

"Present in an article" as used herein with respect to an additive means that the additive is present within an article (i.e., not present on a surface of the article) and/or present on a surface of an article. In one example, the present in an article with respect to an additive means that the additive is not present on a surface of the article, for example plybond glue bonding two or more plies of fibrous structures together at embossment sites.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Method for Determining Location of Additive

The method of determining the location of an additive in an article with respect to a surface feature present on a surface of an article.

As shown in FIG. 1, the method of the present invention 10 for determining the location of an additive with respect to a surface feature present on a surface of an article, such as a web and/or fibrous structure, comprising the additive, comprises the steps of:

a. collecting data from a surface of an article 12;

b. collecting data from an additive present in the article 14; and c. comparing the data collected from the surface of the article 12 with the data collected from the additive present in the article 14 to determine the location of the additive with respect to a surface feature present on the surface of the article 16.

In one example, the method of the present invention further comprises the steps of creating an image from the data collected from the surface of the article and creating an image from the data collected from the additive present in the article.

In another example, the step of comparing the data collected from the surface of the article 12 with the data collected from the additive present in the article 14 to determine the location of the additive with respect to a surface feature present on the surface of the article 16 comprises overlaying images created from the data collected form the surface of the article 12 and from the data collected from an additive present in the article 14 such that the location of the additive with respect to a surface feature present on the surface of the article 16 is determined.

Figure 2:
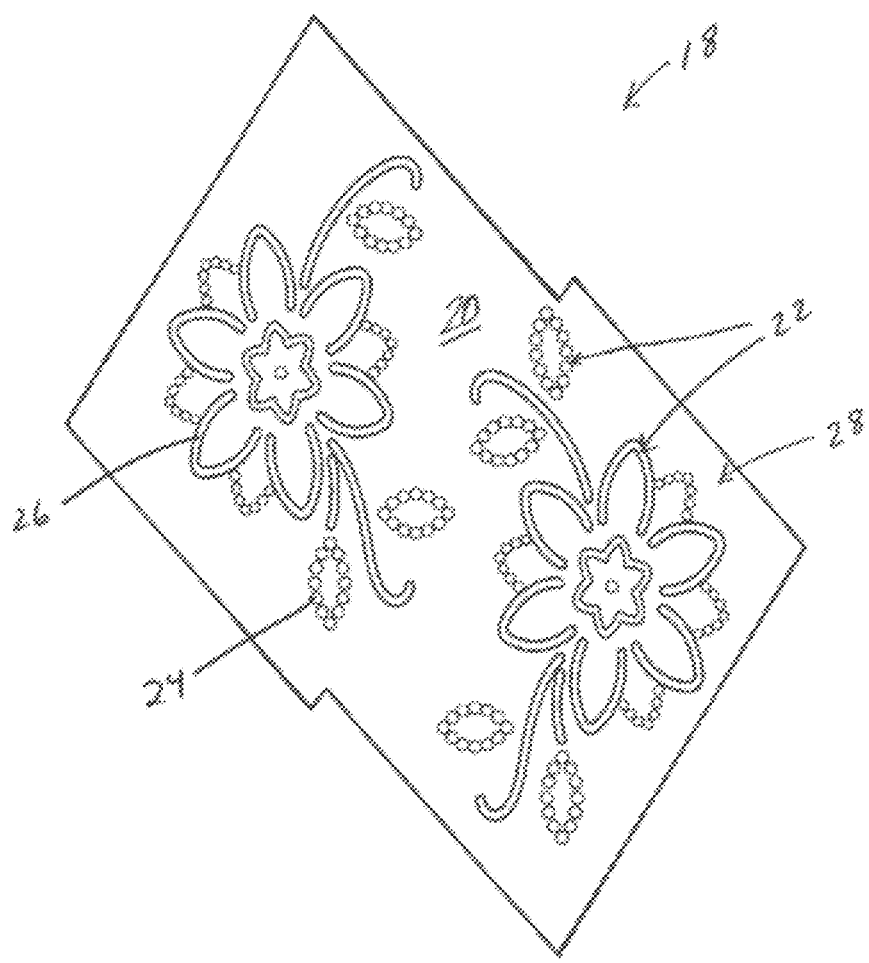
FIG. 2 is a schematic representation of an example of an article according to the present invention.

In one example, as shown in FIG. 2, an article 18, such as a fibrous structure, comprises a surface 20 comprising one or more embossments 22. The embossments 22 may comprise dot embossments 24 and/or line art embossments 26. The article 18 may comprises a multi-ply fibrous structure such that a plybond glue bonds the first ply of fibrous structure 28 to a second ply of fibrous structure (not shown) at one or more of the embossments 22. The plybond glue may comprise a fluorescing agent, such as Tinopal® commercially available from BASF.

In addition to the surface features comprising embossments, the surface features present on a surface of an article may also comprise two or more regions of different properties such as two or more regions of different density, two or more regions of different elevation, two or more regions of different texture, two or more regions of different basis weight, two or more regions of different absorbency, two or more regions of different strength (wet or dry strength) and/or two or more regions of different softness.

In another example, the surface features may comprise one or more depressions. One or more of the depressions may comprise a wet-molded depression, such as a depression formed during making of a fibrous structure. In another example, one or more of the depressions may comprise a thermally bonded depression. In still another example, one or more of the depressions may comprise a wet-pressed depression. In yet another example, one or more of the depressions may comprise a fabric-creped depression. In even another example, one or more of the depressions may comprise a belt-creped depression.

Figure 3:
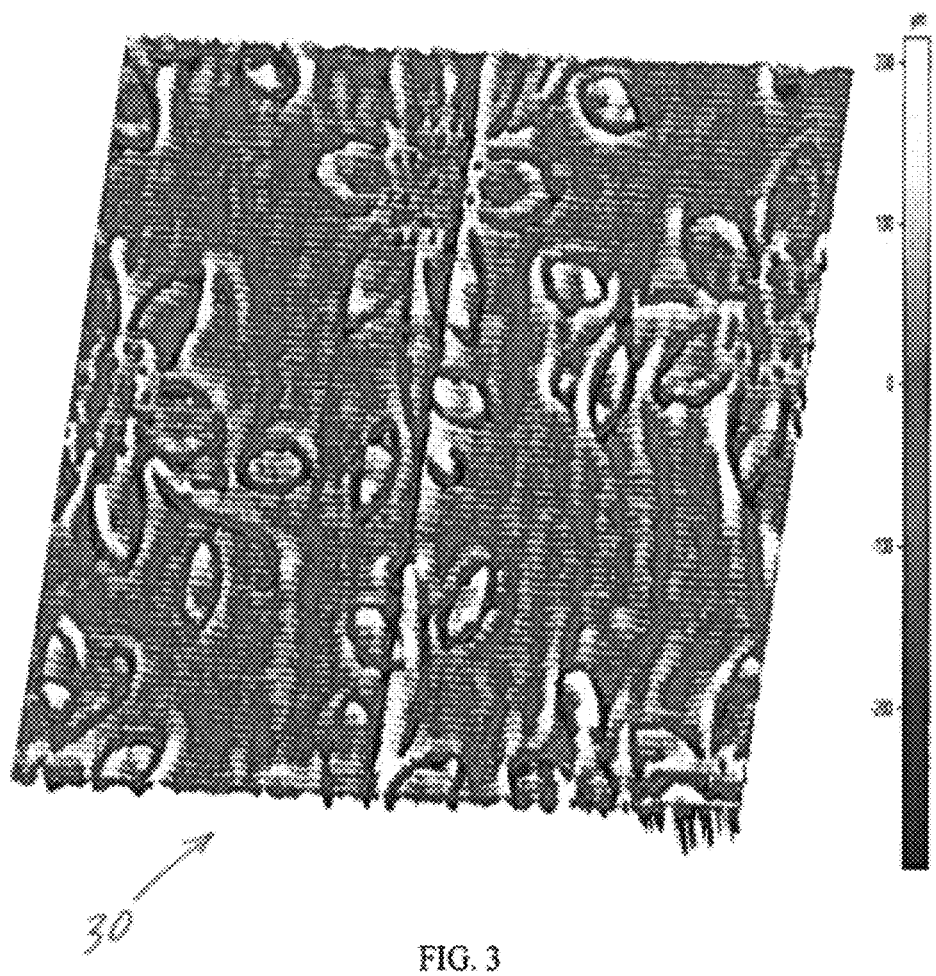
FIG. 3 is a grayscale and 3D surface height image of a surface of an article.

FIG. 3 shows an example of an image 30 of the surface 20 of the article 18 created from data collected from the surface 20 of the article 18 that captures the one or more embossments 22 such that the embossments 22 are discernible from the image 30 of the surface. In one example, the image 30 is a grayscale and/or 3D surface height image of a surface of an article. The image 30 may be saved in any image format so long as the script that is used to combine the data that creates the image 30 with the data that is used to create the image of the additive present in the article can interpret the image format, for example a jpeg file, a tiff file, a raw file, etc.

The data collected from a surface of an article 12 can be used to create one or more images of the surface of the article 18 including any surface features, such as embossments and/or regions that exhibit different properties, such as a high density region compared to one or more other lower density regions within the article.

The data collected from an additive present in the article 14 can be used to create an image of the additive present in the article 18.

The image 30 of the surface 20 of the article 18 may comprise a three-dimensional optical image of the surface.

The image 30 of the surface 20 of the article 18 may comprise a 3D topology image. The data collected from the surface of the article 12 may be processed using operating software having an align function to remove any image tilt. Once processed, the image 30 may be exported as a Fringe File Version 1 format (".FD3").

In one example, the image 30 of the surface 20 of the article 18 may capture one or more embossments and/or two or more regions (not shown) of different properties such that the two or more regions are discernible from the image 30 of the surface 20.

Figure 4:
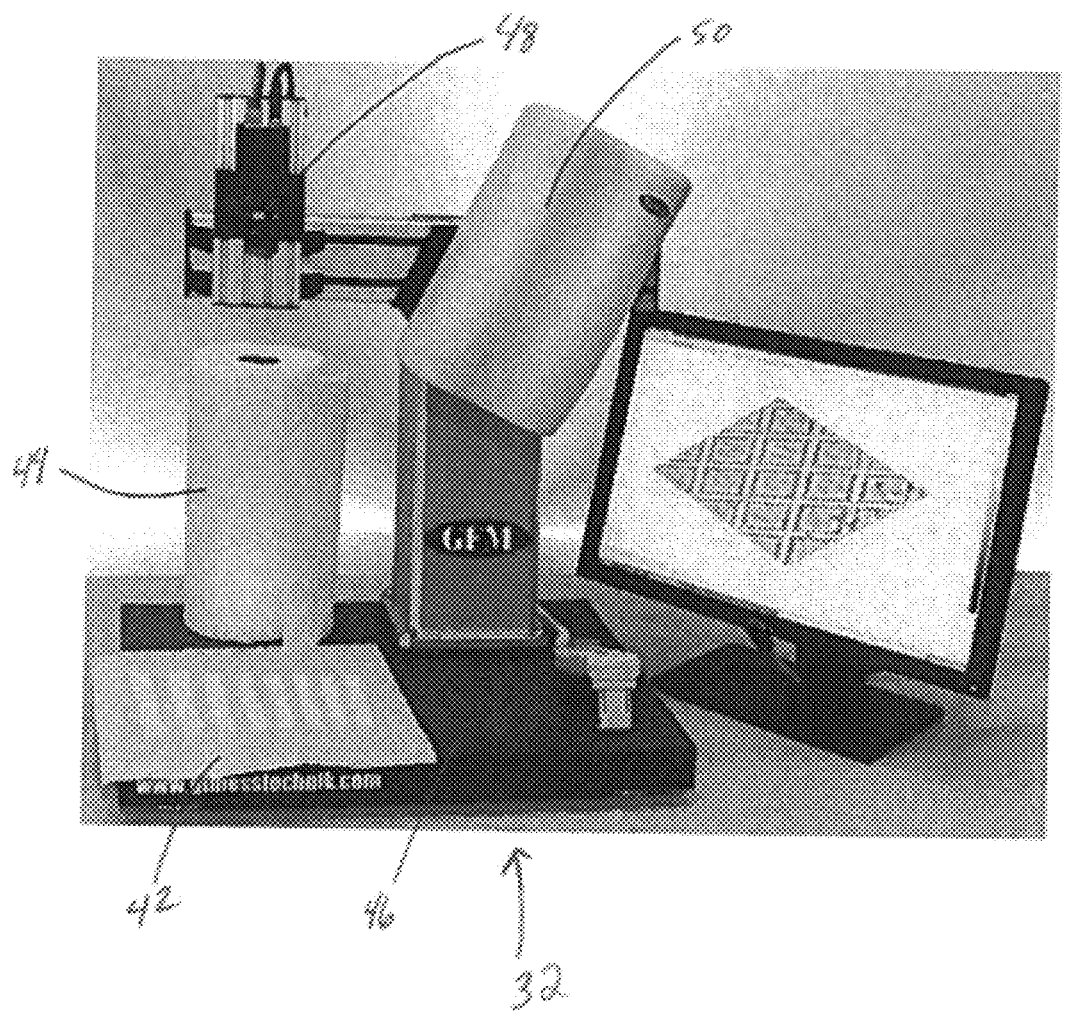
FIG. 4 is a schematic illustration of a data collecting system for collecting data from a surface of an article and from an additive present in an article.

The step of collecting data from a surface of an article 12 may comprise collecting data from a surface of an article using an optical 3D data collecting device 32. In one example, the optical 3D data collecting device 32 outputs the data collected in a digitized format. Non-limiting examples of suitable optical 3D data collecting devices 32 include light profilometers, such as structured light profilometers, mechanical stylus profilometers, laser-based interferometers, optical interferometers, and mixtures thereof. The optical 3D data collecting device 32 may be a structured light profilometer. In one example, the optical 3D data collecting device 32 comprises a MikroCAD optical 3D measuring device, for example a GFM MikroCAD optical 3D measuring device as shown in FIG. 4. The optical 3D data collecting device 32 may comprise operating software, for example an ODSCAD operating software.

Figure 5:
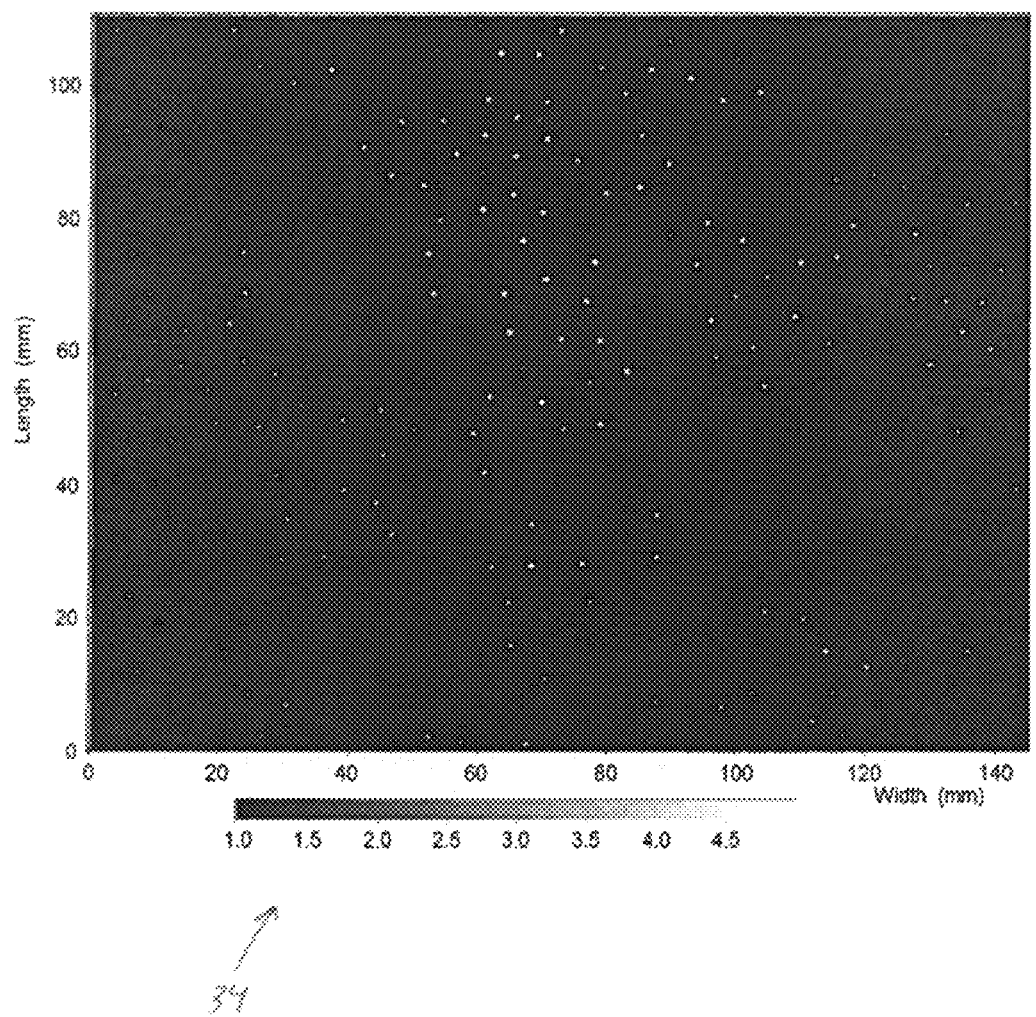
FIG. 5 is a fluorescence image of an additive present in the article shown in FIG. 2.

FIG. 5 shows an example of an image 34 from an additive 36 present in an article 18 created from data collected from the additive present in the article 14. The image 34 of the additive 36 present in the article 18 may be a fluorescent image.

The step of collecting data from an additive present in an article 14 comprises collecting data from an additive present in an article 14 using a fluorescence data collecting device 38, such as a 3D data collecting device, for example a MikroCAD optical 3D measuring device, for example while the additive is fluorescing, such as while the article is illuminated with a UV light. In one example, the fluorescence data collecting device 38 may be the same as the optical 3D data collecting device 32, as shown in FIG. 4, used to collect the 3D optical data of the surface of the article as described above. In one example, the fluorescence data collecting device 38 may be a GFM MikroCAD optical 3D measuring device.

In one example, the fluorescence data collecting device 38 may comprise a CCD imaging system capable of converting filtered light into a grayscale image. The image 34 of the additive 36 present in the article 18 may comprise a grayscale fluorescence image as shown in FIG. 5. In one example, the fluorescence data collecting device 38 comprises a band pass filter having the following characteristics: $\lambda_m$=360 nm (center wavelength), FWHM=45.0. In another example, the fluorescence data collecting device 38 comprises a charge coupled device imaging sensor. The image 34 may be saved in any image format so long as the script that is used to combine the data that creates the image 30 with the data that is used to create the image 34 of the additive present in the article can interpret the image format, for example a jpeg file, a tiff file, a raw file, etc.

In one example, data collected from the surface of the article 12 and data collected from the additive present in the article 14 are collected from the same x-y position of the surface of the article 18.

In one example, data collected from the surface of the article 12 and data collected from the additive present in the article 14 may be collected by the same collecting device, for example a single collection device may perform both steps of data collection from the surface of the article 12 and the data collection from the additive present in the article 14. The single collection device may be a GFM MikroCAD optical 3D measuring device.

Figure 6:
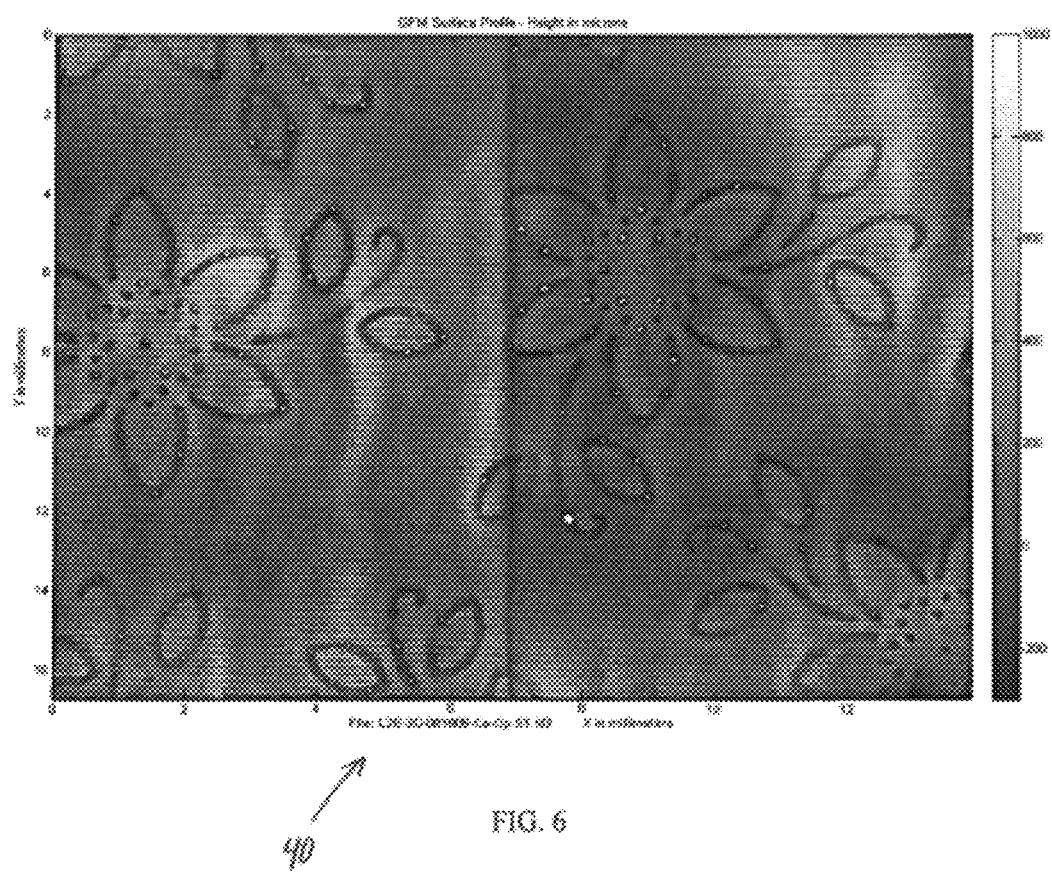
FIG. 6 is a combined image of FIGS. 3 and 5.

Once the image 30 of the surface 20 of the article 18 and the image 34 of the additive 36 present in the article 18 are created from their respective data collections, the images 30, 34 are overlayed, such as by mathematically superimposing one image onto the other image, such as shown in FIG. 6 to form a combined 3D and grayscale fluorescence image 40. For example, the image 34 of the additive 36 present in the article 18, for example a grayscale fluorescence image of the additive 36 present in the article 18, is superimposed, for example mathematically, onto the image 30 of the surface 20 of the article 18, for example a grayscale optical 3D image of the surface 20 of the article 18. This overlaying may be performed automatically by a computer program, such as a Matlab script. One or both of the images 30, 34 may be adjusted, such as re-sized, if necessary. For example, the image 34 of the additive 36 present in the article 18 may be re-sized, if needed, to match the size of the image 30 of the surface 20 of the article 18.

In one example, the image 34 of the additive 36 present in the article 18 may be modified, if necessary, using a pixal threshold technique such that all data within the image 34 of the additive 36 present in the article 18 below a particular threshold is eliminated from the image 34, for example by giving such data a black grayscale value (zero).

The percentage transparent of the image 34 of the additive 36 present in the article 18 may be adjusted to permit the image 30 of the surface 20 of the article 18 to be visible and/or measurable through the image 34 of the additive 36 present in the article 18 when the image 34 of the additive 36 present in the article 18 is superimposed, such as by mathematically superimposing the image 34 of the additive 36 present in the article 18 upon the image 30 of the surface 20 of the article 18.

The methods of the present invention for determining the location of an additive present in an article with respect to a surface and/or surface feature (such as an embossment) and/or a surface region of an article can be performed offline (after the article has removed from a manufacturing line) and/or online (before the article has been removed from a manufacturing line). The methods may be automated, such as performed by one or more machines and/or computers, and/or manually performed by a human.

Additive

The articles of the present invention comprise at least one additive that is not visible to a consumer of an article. In one example, the additive may be colorless. In another example, the additive may be textureless. In another example, the additive may be in liquid form, at least when it is added to the article. In another example, the additive is not discernible by any of the senses of a consumer at least prior to consumption and/or use of the article, for example not discernible by a consumer's sight and/or olfactory senses. Non-limiting examples of additives suitable for inclusion in the articles of the present invention are glue and/or adhesives, such as plybond glue for example polyvinyl alcohol, dry strength agents, wet strength agents, softening agents, opacifying agents, perfume, oils, humectants, latexes, lotions, surfactants, soil removal agents, flavor agents, medicinal agents, bleaching agents, teeth-whitening agents, pharmaceutical agents, dyes, inks, and mixtures thereof.

If the additives don't fluoresce, a fluorescing agent may be added to the additives in order to be able to facilitate creation of the fluorescence image according to the present invention.

In one example, the manufacturer of the article may include an additive that fluoresces and/or a fluorescing agent (such as including a fluorescing agent such as Tinopal® in a plybond glue that holds at least one ply of fibrous structure together with another ply of fibrous structure. One of the plies may comprise one or more embossments) in an additive during production of the article.

Method of Producing an Article

In one example, an article comprises a multi-ply sanitary tissue product that is produced by a method comprising the step of plybonding a first fibrous structure ply with a second fibrous structure ply using a plybond glue that fluoresces. In another example, a multi-ply sanitary tissue product is produced by a method comprising the step of plybonding a first fibrous structure ply with a second fibrous structure ply using a plybond glue that comprises a fluorescing agent. The location of the additive (the plybond glue in this case) can be determined according to the methods of the present invention described herein.

Non-Limiting Examples of a Multi-Ply Fibrous Structure

An embossed multi-ply fibrous structure according to the present invention is made by bonding two fibrous structure plies, for example two embossed through-air-dried fibrous structure plies, together such that the embossed multi-ply fibrous structure comprises at least one line element embossment greater than 15 mm in length wherein only a portion of the line elements embossment is bonded and wherein the bonded portion of the embossment comprises three or more separate and substantially continuous regions of the embossment.

An embossed multi-ply fibrous structure according to the present invention is made by bonding two fibrous structure plies, for example two embossed through-air-dried fibrous structure plies, together such that the embossed multi-ply fibrous structure comprises at least two embossments wherein at least a portion of each embossment is bonded with adhesive.

An embossed multi-ply fibrous structure according to the present invention is made by bonding two fibrous structure plies, for example two embossed through-air-dried fibrous structure plies, together such that the embossed multi-ply fibrous structure comprises at least two embossments wherein at least a portion of each embossment is bonded with adhesive.

Permeable Roll Applicator

A permeable roll of the present invention comprises an interior volume that is in fluid communication with an exterior environment. In one example, the permeable roll comprises a shell having an interior surface and an exterior surface connected to one another via one or more discrete holes which permits fluid communication from the interior volume to an external environment.

The permeable roll of the present invention may have an outer diameter that is the same as the outer diameter of any patterned embossing rolls (30.48 cm (12.00 inches) in this example) associated with the permeable roll. The permeable roll may have a stainless steel or carbon composite material shell thickness of 0.3175 cm (0.125 inch). The discrete holes in the permeable roll shell through which adhesive flows are approximately 0.2032 mm (0.008 inch) in diameter.

A typical shell fabrication process includes making a 0.3175 cm (0.125 inch) thick shell from carbon composite material and then mechanically drilling holes with the target 0.2032 mm (0.008 inch) diameter. The holes may be drilled in specific locations that may be registered to embossments or portions of embossments. Another shell fabrication process includes making a 0.3175 cm (0.125 inch) thick shell from carbon composite material and then mechanically drilling holes with at an oversized target of 0.1524 cm (0.060 inch) diameter, then spin casting epoxy or resin to fill the holes, allowing the epoxy and/or resin to cure, and then mechanically redrilling holes with the final target of 0.2032 mm (0.008 inch) diameter within the epoxy and/or resin regions within the previously drilled 0.2032 mm (0.008 inch) diameter holes.

An alternative shell fabrication process includes making a sand casting of a shell with greater thickness than required in final form, grinding the shell to a thickness of 0.6858 cm (0.27 inch), trepan drilling via laser, holes which extend from the shell inside surface to the shell outside surface in desired locations with a diameter of 0.1016 cm (0.040 inch), plasma spray coating a stainless steel based coating on the outer surface of the shell at a thickness greater than 0.1016 cm (0.040 inch), grinding the outer surface of the shell to achieve a total thickness of 0.7874 cm (0.31 inch), and then laser drilling holes with a diameter of 0.2032 mm (0.008 inch) that extend from the outer surface of the shell's plasma spray coating to the inner surface of the plasma spray coating such that the 0.2032 mm (0.008 inch) diameter hole is aligned with and completely within the 0.1016 cm (0.040 inch) diameter hole.

Other fabrication techniques as known to one of skill in the art may be used, including drilling via laser or electron beam, using concentric shells wherein the outer shell is thinner (allowing easier drilling of relatively small diameter holes) than the inner shell and is heat shrunk on the inner shell (which has been pre-drilled with larger holes which will be aligned with new holes in the thin outer shell), or other suitable techniques. Non-limiting processes for creating holes in the roll to make it a permeable roll include laser drilling, electron beam drilling, mechanical drilling, electrical discharge machining drilling, chemical engraving, metalizing processes, sintering processes, castings and combinations thereof. Another fabrication technique is the insertion of pre-perforated inserts into the shell.

Adhesive flow through the holes in the permeable roll during operation (i.e., during rotating of the permeable roll) may be directly controlled via a positive displacement pump and/or pressure regulation at the inlet to the hole within the interior surface of the permeable roll which is balanced with the pressure drop through the hole and results in a controlled flow rate. The size and pattern of the holes may be designed to provide a desired add-on rate and adhesive application pattern for a chosen adhesive and viscosity with minimum air entrainment into the adhesive application system. Adhesive flow can be adjusted on the run via adjustment of the positive displacement pump speed and/or internal pressure and may be controlled in relation to other system parameters such as line speed, operating temperature, and the like.

The holes in the permeable roll may be fabricated with any desired fluid application pattern and the fluid can be applied to a fibrous structure in contact with the permeable roll such that fluid is applied exactly where it is desired and with no fluid transfer at any other location. The permeable roll circumference and drive can be designed to match/register other process transformations, such as embossing. For example, adhesive may be applied in phased relationship to other fluids, perforations, cross machine fibrous structure edges, embossing, printing, etc. Phasing may be achieved via close coupling (direct gear drive for adjacent rolls performing different transformations), web handling/feed rate matching, closed loop control with sensing of the adhesive and other transformations in the fibrous structure, or any other suitable means. This phasing potential enables more efficient utilization of adhesives in the fibrous structure product design, thereby improving quality while minimizing adhesive cost, and enables potential synergies between transformations (e.g. highlight emboss or perforations, complement printing, etc.).

The holes in a permeable roll may be designed to match portions or all of embossments in an embossed fibrous structure. The permeable roll and the embossing roll, which imparts the embossments to the fibrous structure, may have the same diameter and circumference or a multiple of each other which may result in a mismatched speed at transfer but would still stay in phase, or it is possible to have rolls of different diameter but the emboss pattern, adhesive pattern and/or roll diameters may be such that they all stay in phase either with matched speed or mismatched speed. The permeable roll can be positioned adjacent to the embossing roll and driven in synchronization with the embossing roll via direct gear drive, timing belt, linked servo drives, and/or other suitable means to apply drops of adhesive on a desired portion of embossments in a fibrous structure after embossing and prior to the embossed fibrous structure being joined with another fibrous structure and compressed/laminated together in a marrying nip. In this manner a desired 2-ply embossed and laminated product can be produced wherein the adhesive laminating fluid is phased to embossing. This can create an embossed product having a greater softness because adhesive is only applied to the embossed fibrous structure where needed, the adhesive is also only applied to recessed embossed areas of the fibrous structure (once in sanitary tissue product form), and the adhesive zones in the fibrous structure have a relatively high volume of adhesive, thereby enabling sufficient plybond strength even with a relatively low plybonded area (less plybonded area enhances fibrous structure flexibility, a key element in consumer softness perception).

The holes in the permeable roll may be registered to an emboss pattern present on an embossed fibrous structure to provide adhesive application only on embossments or a portion of the embossments within the embossed fibrous structure. For example, adhesive may be applied to only to a portion of dot and/or line element embossments present in an embossed fibrous structure as a result of the holes of the permeable roll that applies the adhesive being registered to only a portion of the dot and/or line element embossments such that only portions of the embossments and/or portions of portions of the embossments are plybonded. For example, adhesive may be applied to a linear embossment that is 8 mm in length wherein the adhesive is only present in the middle region of the linear embossment. In another example, adhesive may be applied to only the two end regions of a linear embossment 13 mm in length. In another example, adhesive may be applied to a linear embossment that is 18 mm in length wherein the adhesive is only present at the two end regions of the embossment and the middle region of the embossment. In another example, adhesive may be applied to a dot embossment wherein the adhesive is only present in a central portion of the dot embossment. Further, the adhesive may be delivered from the permeable roll at any rate. For example, an adhesive may be forced through the holes of the permeable roll by a positive displacement pump, such as a Seepex positive displacement pump, and/or pressure regulation at a rate of 0.013 g/m$^2$ in the fibrous structure or about 0.003 g/minute/hole when operating a fibrous structure application speed of about 2000 feet per minute.

The permeable roll may be made by any suitable materials. Non-limiting examples of suitable materials for the permeable roll include steel, aluminum, other metals, carbon composite materials, plastics, natural rubber, synthetic rubber and/or other materials that provide a relatively rigid surface comprising holes for application flow.

The permeable roll may be fabricated as a single unit or may comprise sleeve sections (both in the circumferential and cross machine directions) that combine to form the permeable roll.

Non-Limiting Example of Image Capture

As shown in FIG. 4, a sample 42, for example a multi-ply fibrous structure, to be analyzed is collected, for example from a roll 44 of sample, and placed flat on a stage 46 for imaging by the optical 3D data collecting device 32. The sample size is approximately 4"×8". A small amount of tension is applied, without damaging the sample, to eliminate and/or reduce any wrinkling in the sample 42 by placing weights on each end of the sample 42. Wrinkling is also eliminated and/or reduced via digital image processing filters.

A camera 48 is positioned above the sample 42 to collect the images. Ensure that the projector output port 50 is emitting light onto the sample 42. Set the Lighting settings to the following: Brightness 5, Dynamic 1. Click "Live Image" and then "Measure," which will collect data from the surface of the sample 42. When the measurement is finished, a color coded 3D image of the surface of the sample 42 will have been generated. Click "Save" in order to save the 3D data and image. Save the 3D data and image in the FD3 version format.

To collect data from an additive present in the sample 42, make sure that the sample 42 has not moved after collecting the data from the surface of the sample 42. Eliminate as much ambient lighting as possible and turn a black light (not shown) on to illuminate the sample 42. Make sure that any housing associated with the black light is not visible in the camera image. Cover or do not turn on the projector output port 50. Use the same brightness settings that were used for collecting the data from the surface of the sample. In the File menu select "Save Camera Image" to capture an image of the additive's fluorescence. Save the image of the additive.

Enter the image of the surface and the image of the additive into a MatLab program to visualize the additive on the 3D surface image.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same wan in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for determining the location of an additive with respect to a surface feature present on a surface of a web comprising the additive, the method comprising the steps of:
   a. collecting data from a surface of a web using a 3D data collecting device;
   b. collecting data from an additive present in the web; and
   c. comparing the data from the surface of the web and from the additive present in the web to determine the location of the additive with respect to a surface feature present on the surface of the web comprising:
      creating an image from the data collected from the surface of the web;
      creating an image from the data collected from the additive present in the web; and
      overlaying the images such that the location of the additive with respect to a surface feature present on the surface of the web is determined.

2. The method according to claim 1 wherein the 3D data collecting device comprises a light profilometer.

3. The method according to claim 1 wherein the 3D data collecting device is selected from the group consisting of: mechanical stylus profilometers, laser-based interferometers, optical interferometers, and combinations thereof.

4. The method according to claim 1 wherein the method further comprises the step of creating an image of the surface of the web from the collected data from the surface of the web.

5. The method according to claim 4 wherein the image of the surface of the web comprises a grayscale image.

6. The method according to claim 5 wherein the image of the surface of the web comprises a 3D surface height image.

7. The method according to claim 1 wherein the surface of the web comprises two or more regions of different elevation.

8. The method according to claim 1 wherein the web comprises a fibrous structure.

9. The method according to claim 1 wherein the web comprises a multi-ply sanitary tissue product.

10. The method according to claim 1 wherein the surface of the web comprises one or more embossments.

11. The method according to claim 1 wherein the surface of the web comprises one or more depressions.

12. The method according to claim 1 wherein the additive fluoresces.

13. The method according to claim 1 wherein the additive is selected from the group consisting of: glues, dry strength agents, wet strength agents, softening agents, opacifying agents, perfume, oils, humectants, latexes, lotions, surfactants, soil removal agents, flavor agents, medicinal agents, bleaching agents, teeth-whitening agents, pharmaceutical agents, dyes, inks, and mixtures thereof.

14. The method according to claim 1 wherein the additive comprises a fluorescing agent.

15. The method according to claim 1 wherein the method further comprises the step of creating an image of the additive present in the web from the collected data from the additive present in the web.

16. The method according to claim 1 wherein the step of overlaying the images comprises mathematically superimposing one image onto the other image.

17. The method according to claim 1 wherein at least one of the steps of the method is performed by a computer.

* * * * *